May 2, 1950  J. F. MELICHAR  2,506,097
VALVE ASSEMBLY FOR FUEL SYSTEMS
Filed April 28, 1944  2 Sheets-Sheet 2
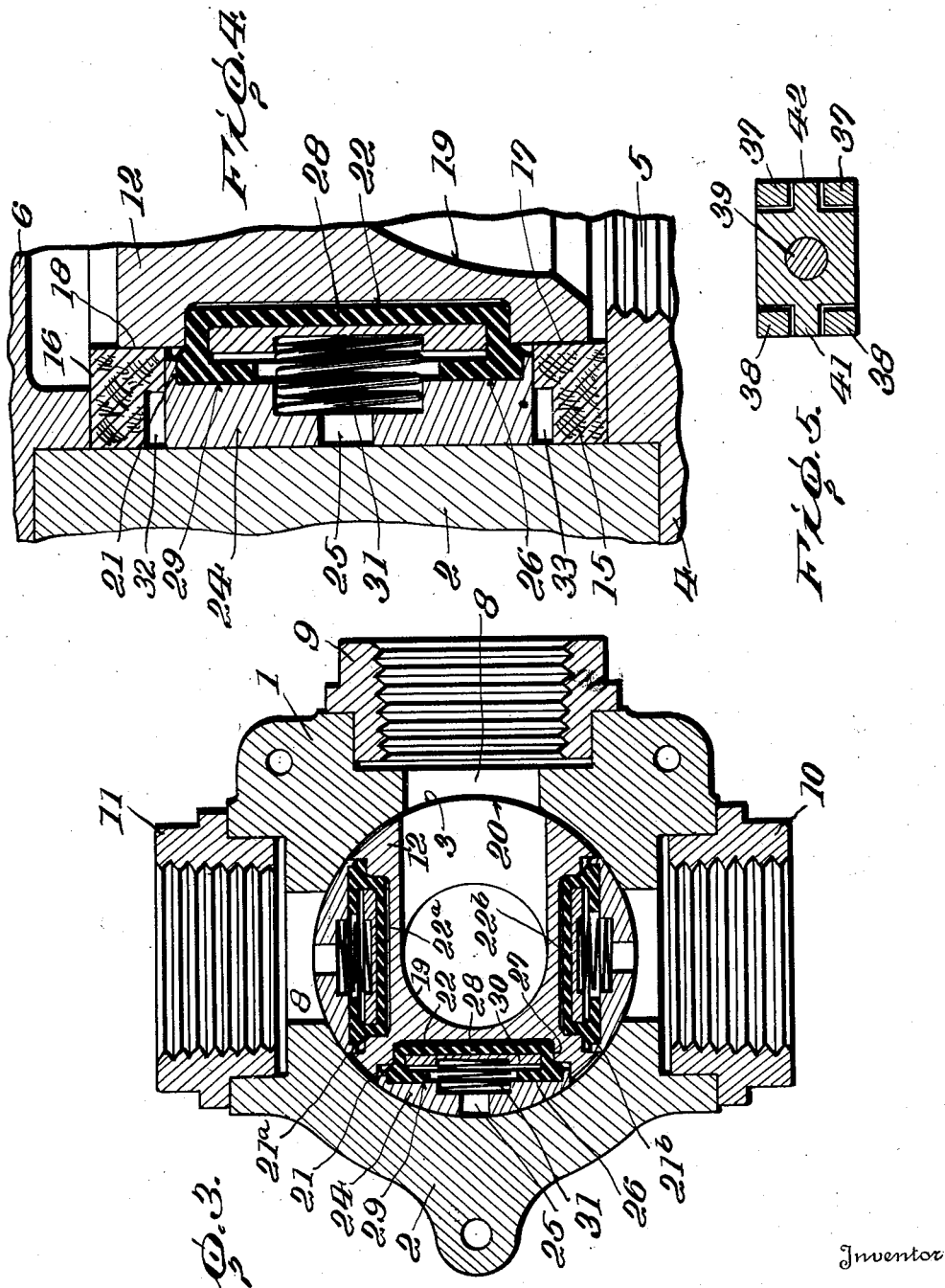
Inventor
Joseph F. Melichar
By Mason, Porter & Diller
Attorneys Patented May 2, 1950

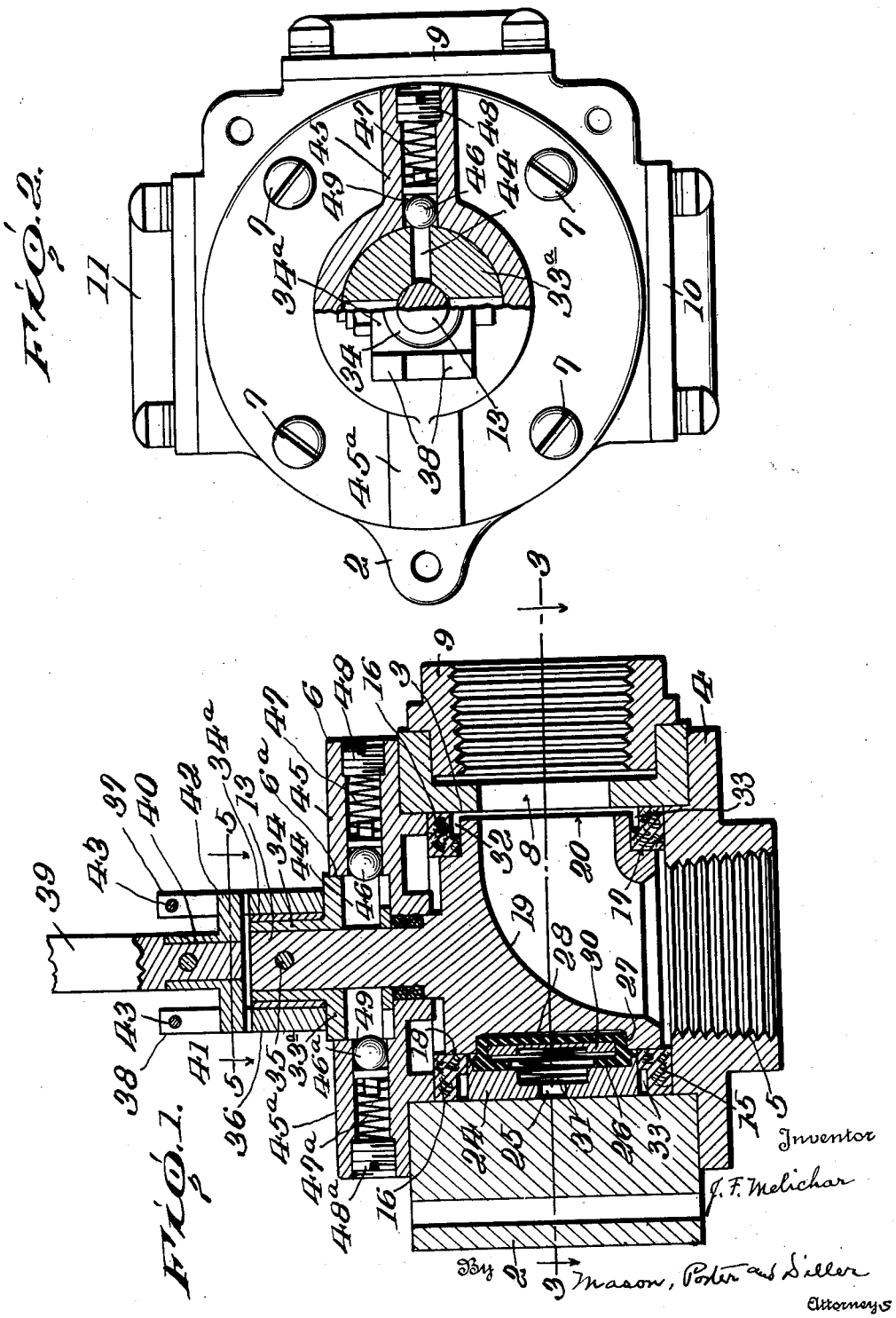

2,506,097

UNITED STATES PATENT OFFICE 2,506,097

VALVE ASSEMBLY FOR FUEL SYSTEMS

Joseph F. Melichar, Cleveland, Ohio, assignor to The Parker Appliance Company, Cleveland, Ohio, a corporation of Ohio Application April 28, 1944, Serial No. 533,182

3 Claims. (Cl. 251—102)

The invention relates to new and useful improvements in a valve assembly for selectively dispensing fuel which assembly is especially adapted for use in aircraft construction.

In the patent granted Arthur L. Parker, March 23, 1943, No. 2,314,512, there is shown and described a valve assembly for selectively distributing fuel wherein the valve rotor is out of contact with the wall of the casing and is centered and guided in its rotations by wear plates mounted on the rotor and contacting with the casing.

An object of the invention is to provide a valve assembly of the above type wherein non-metallic wear members for centering the rotor in the valve casing are provided, which members are so constructed and arranged as to maintain said rotor both circumferentially and at its ends from contact with the valve casing.

A further object of the invention is to provide a valve assembly of the above type with an annular channel which is connected to the fluid flow through the valve so that the valve rotor is subjected to radial pressure of the fluid at all points on the exterior surface thereof whereby the valve is balanced and the turning torque and wear resistance reduced to a minimum.

A still further object of the invention is to provide a valve assembly of the above type wherein the valve rotor is provided with independent valve units for controlling the ports through which the fluid is dispensed.

Another object of the invention is to provide a valve assembly of the above type wherein the non-metallic wear members which center the rotor also serve as guides for the valves carried by the rotor.

These and other objects will in part be obvious and will in part be hereinafter more fully disclosed.

In the drawings

Figure 1 is a vertical sectional view through a valve assembly embodying the improvements showing the intake port connected to a selected one of the dispensing ports.

Figure 2 is a view partly in plan and partly in section of the valve assembly as viewed from above, with the operating means for turning the valve stem detached.

Figure 3 is a sectional view on the line 3—3 of Figure 1.

Figure 4 is a view showing a portion of the valve casing in vertical section and on an enlarged scale with a valve closing a port.

Figure 5 is a sectional view on the line 5—5 of Figure 1.

The improved valve assembly includes a valve casing 1 which has at one side thereof a projecting lug 2 which may be utilized for securing the valve to a fixed part. The valve casing has a cylindrical passage extending vertically therethrough thus forming a valve chamber 3. The lower end of the valve casing is closed by a bottom plate 4 having an outlet 5 through which fluid is delivered from a selected one of a plurality of sources as will hereinafter become apparent. The valve casing is closed at the upper end by a cap 6. The cap is secured to the housing by suitable screws 7, 7. The bottom plate is secured by a similar means to the valve casing. As shown in Figure 2 of the drawings, the valve housing is provided with three inlet openings, one of which is illustrated in Figure 1 at 8. Connected to the valve housing in alignment with the ports therein are adapters 9, 10 and 11. These adapters are connected to suitable pipes leading to separate sources of supply. While three ports and adapters are shown, it will be understood that any number of ports may be provided within the limits of the construction.

Mounted in the valve casing is a valve rotor 12. This valve rotor has a stem 13 preferably integrally attached to the rotor. This stem extends through the cap 6 and in part centers the rotor in the valve housing. There are suitable packing rings 14 disposed between the stem and the cap 6 so as to provide a fluid-tight joint between the stem and the cap. The cap and also the bottom plate are attached to the casing by suitable packing glands so that there is a fluid-tight connection between these parts and the valve casing. The valve rotor is so dimensioned that it does not contact with the wall of the cylindrical chamber 3 in which it rotates.

Mounted on the rotor is a wear member 15. This wear member is non-metallic and is preferably made of material such as laminated linen base plastics. There is a wear member 16 at the upper side of the rotor which is similarly constructed.

The valve rotor is provided with an annular recess 17 which is so dimensioned relative to the wear member 15 that the wear member fits snugly on the end of the valve rotor. This wear member is of a thickness slightly greater than the depth of the annular recess in the rotor so that the bottom end of the rotor does not contact with the bottom plate 4. The wear member 15 makes contact with the wall of the cylindrical chamber and also with the bottom plate.

The rotor is also provided with an annular recess 18 at its upper side and the wear member 16 snugly fits on the extension of the rotor formed by this annular recess. The wear member is of greater thickness than the depth of the recess, so that it contacts with the cap 6 as well as the wall of the cylindrical chamber. From the above it will be noted that the rotor is out of contact with the wall of the cylindrical chamber of the casing and also out of contact with the bottom plate and the cap. These wear members contact with the bottom plate and also contact with the cap and thus prevent any endwise movement of the rotor in the valve casing. These wear members made of laminated linen base plastics are non-yielding and will, therefore, hold the rotor in a fixed operating position out of contact with the casing and the end members and thus greatly facilitate the ease with which the rotor may be turned from one set position to another.

The valve rotor is provided with a passage 19 which communicates with the opening 5 in the bottom plate at all set positions of the valve rotor. This passage 19 leads to a radial passage 20 in the valve rotor and this radial passage 20 is adapted to be brought into alignment selectively with the ports in the valve casing, or positioned so that the passage 20 is closed by the valve casing.

Diametrically opposed to the radial passage 20, the valve rotor has a recess 21 which extends from the upper end to the lower end of the rotor. The side walls of this recess are parallel with each other. Midway between the upper and lower ends of the rotor, there is a circular recess 22 which is formed in the bottom of the recess 21. The rotor is also provided with recesses 21a and 21b and also circular recesses 22a and 22b. These recesses are all similarly shaped and associated with each recess is a valve unit. Inasmuch as all of these valve units are of similar construction, only one will be described.

The valve unit includes a valve proper 24 which is adapted to close a port when brought into register therewith. This valve unit has its outer face formed cylindrically to conform to the wall of the cylindrical chamber in the valve casing. The wear members 15 and 16 close the ends of the recess 21 and serve as a guiding means for the valve 24 preventing said valve 24 from moving endwise of the rotor. The walls of the recess 21 also engage the side walls of this valve and, while permitting radial movement, positively rotate the valve with the rotor. The valve 24 is formed of non-metallic or composition material and is the only part of the valve rotor which contacts with the cylindrical wall of the valve casing.

The valve 24 has an opening 25 therethrough leading to the inner face of said valve. There is a cylindrical recess 26 in the inner face of the valve. There is also a cylindrical recess 27 in the valve rotor. A cup-shaped member 28 of rubber or some similar material is disposed in said recess 27 in the rotor. This member 28 has a flange 29 which fits within the recess 26 and the flange is vulcanized or otherwise secured to the valve so as to form a fluid-tight connection therewith.

Disposed within this cup-shaped member 28 is a plate 30 which is provided with a central recess and a spring 31 located in the recess abuts against the plate and it also abuts against the bottom of a recess formed in the valve 24. This spring normally forces the valve 24 radially outward from the center of rotation of the rotor and holds said valve in contact with the wall of the cylindrical chamber. As noted above, each recess is provided with a valve unit. They are all independently mounted and are adapted to be brought into register selectively with the ports so that all three ports may be closed, or one or another of the ports opened, or more than one port opened so that fluid may be drawn from a source of supply selectively and delivered by the valve through the pipe connected with the opening 5 to the place where it is to be utilized.

When the valve is in register with a port so as to close the port, it is subjected to fluid pressure from the source of supply connected with the controlled port. The opening 25 communicates with the interior of the cup-shaped member 28 so that the inner and outer faces of the valve are subjected to the same fluid pressure. The area of the circular recess in the valve rotor is so dimensioned relative to the faces of the port that the valve is balanced so far as the fluid pressure is concerned so that the spring does not have to operate against the fluid pressure in the holding of the valve seated and the port closed.

The wear member 15 is provided on its inner face and at the outer portion thereof with an annular channel 33. The wear member 16 is provided with a similar channel 32. Referring to Figures 1 and 3, it will be noted that, when the valve rotor is positioned for connection with a port leading to a supply of fluid, the fluid under pressure can enter these channels and that portion of the cylindrical chamber between the wear members will be subjected to the fluid pressure of the fluid in the connected port at all sides of the rotor. This will reduce a great deal of pressure on the rotor to substantially the same amount at all points so that the lateral pressure on the rotor is balanced. The same is true as to the endwise pressure of the fluid on the rotor and, therefore, the valve rotor is so well balanced that it can be turned with comparatively low torque pressure. Furthermore, all of the parts of the rotor within the cylindrical chamber which move with the rotor and which contact with the valve casing are non-metallic and this prevents any possible freezing of the valve.

The cap 6 is provided with a recess 6a. Disposed in this recess is an indexing member 33a. Said member has an integral sleeve 34 extending upwardly along the valve stem. Mounted on this sleeve 34 is a device for turning the rotor of the valve. This device includes a block 34a rectangular in cross-section. At each side of the block is a plate 36 which is welded thereto. The block and the sleeve are secured to the stem by a pin 35 which extends through the block sleeve and stem.

The plates are provided with upwardly extending spaced arms. There is a pair of these arms 37, 37 at one side of the stem and a pair of arms 38, 38 at the other side of the stem. An operating means for turning the stem and the valve rotor is attached between these arms. It may be in the form of a handle projecting laterally so that the valve stem can be turned thereby or it may be in the form of a shaft. In Figure 1 of the drawings, there is shown a shaft 39 which is preferably of flexible construction. This shaft carries a head 40 having laterally projecting arms 41, 42. The arm 42 projects between the pair of arms 37 and the arm 41 projects between the pair of arms 38. Retaining wires or pins 43 connect the upper ends of the pairs of arms so as to prevent the head on the flexible shaft 39 from moving out of connection with the turning block which is secured to the stem. This makes a simple form of connection. By removing the wires or pins 43, the shaft may be disconnected from the valve if desired.

The indexing member 33 is provided with a series of radial openings 44. There is an opening disposed in alignment with each of the ports to which the valve rotor is selectively connected. The cap is formed with a raised rib 45 which has an opening extending lengthwise thereof. In this opening is a ball 46, a spring 47, an abutment screw 48, and a head 49 which bears against the ball 46. The spring yieldingly forces the ball into contact with the peripheral surface of the indexing member 33 which is circular in horizontal cross-section.

There is a similar rib 45a diametrically opposed to the rib 45 and this rib has an opening extending lengthwise thereof in which is located a ball 46a, a spring 47a, and an abutment screw 48a. When the passage 20 in the valve rotor is drawn into alignment with the port 8 as shown in Figures 1 and 2 then the radial openings 44 which are diametrically opposed to each other will be engaged by the balls 46 and 46a and this will hold the rotor in a set position with the passage 20 in alignment with the port 8. There are diametrically opposed openings 44 for each port so that as the valve stem is turned to bring the passage 20 into alignment with a selected port, the balls will spring into these openings and set the position of the valve rotor with the passage in alignment with the selected port. It will be noted that these spring-pressed balls are diametrically opposed to each other and therefore the lateral pressure on the valve stem of one is balanced by the other and there is no cocking of the valve which will interfere with its rotation.

The indexing means per se forms no part of the present invention but is shown, described and claimed in my copending application filed by me on May 17, 1944, Serial No. 536,035.

From the above it will be noted that a valve assembly has been devised wherein the valve rotor is held centered in the cylindrical chamber of the valve casing without the valve rotor directly contacting with the valve casing. The parts carried by the rotor which serve to center it and which control the ports are non-metallic. It will also be noted that the fluid pressure bearing on the valve rotor is through the channels in the wear members distributed to all sides of the valve rotor so that the lateral pressures thereon are balanced. It will also be noted that the valve may be rotated positively by a connector which is in effect of a single integral structure, pinned directly to the valve stem and the valve may be yieldingly held in a selected set position by devices bearing upon the parts moving with the valve stem at diametrically opposite points so that the lateral strains on the valve stem are balanced and there is no cocking force bearing on the valve rotor. The valve rotor in effect is perfectly balanced and can be easily turned and yet firmly but yieldingly held in any desired selected position.

I claim:

1. A valve assembly comprising a valve casing having a cylindrical chamber provided with ports in the wall thereof, a valve rotor disposed in said chamber and having independent valve members adapted to selectively close said ports, said valve rotor being dimensioned so as to be out of contact with the wall of said cylindrical chamber and annular non-yielding wear members disposed between said rotor and the wall of said cylindrical chamber for maintaining said rotor centered in the valve chamber, said wear members having annular channels on their inner faces communicating with the space between the rotor and the valve casing whereby fluid pressure radially of the valve rotor will be equal at all points.

2. A valve assembly comprising a valve casing having a cylindrical chamber provided with ports in the wall thereof, top and bottom members for closing the cylindrical chamber, a valve rotor disposed in said chamber, said rotor being dimensioned so as to be out of contact with the wall of the cylindrical chamber and the top and bottom members, an independent valve member in said casing having contact with the casing and rotor for selectively closing said ports, and annular non-yielding wear members disposed between the rotor and the wall of the cylindrical chamber and between the rotor and the top and bottom members for maintaining said rotor in a fixed operating position out of contact with the wall of the cylindrical chamber and the top and bottom members, said non-yielding wear members being the sole effective guiding means within the casing for the rotor.

3. A valve assembly comprising a valve casing having a cylindrical chamber provided with ports in the wall thereof, top and bottom members for closing the cylindrical chamber, a valve rotor disposed in said chamber and having independent valve members adapted to selectively close said ports, said valve rotor being dimensioned so as to be out of contact with the wall of the cylindrical chamber and the top and bottom members and non-yielding wear members disposed between the rotor and the wall of the cylindrical chamber and between the rotor and the top and bottom members for maintaining said rotor out of contact with the wall of the valve chamber and the top and bottom members, said non-yielding wear members being annular in shape and mounted on said rotor for movement therewith, said wear members having an annular channel on their inner faces communicating with the space between the rotor and the valve casing whereby fluid pressure radially of the valve rotor will be equal at all points.

JOSEPH F. MELICHAR.

REFERENCES CITED

The following references are of record in the file of this patent:

UNITED STATES PATENTS

| Number | Name | Date |
|---|---|---|
| 810,951 | Larkin | Jan. 30, 1906 |
| 2,198,386 | Hiester | Apr. 23, 1940 |
| 2,209,136 | Parker | July 23, 1940 |
| 2,314,512 | Parker | Mar. 23, 1943 |